June 22, 1926.

P. E. NORRIS 1,589,419

STORAGE BATTERY SEPARATOR

Filed Dec. 5, 1924

INVENTOR;
P. E. Norris,
BY
His ATTORNEY

Patented June 22, 1926.

1,589,419

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY SEPARATOR.

Application filed December 5, 1924. Serial No. 754,119.

My invention relates to storage battery separators.

I will describe two forms of separators embodying my invention, and will then point out the novel features thereof in claims.

Figure 1:
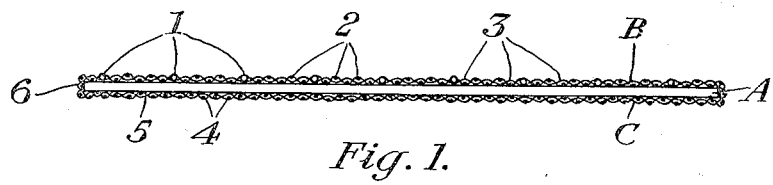
Figure 2:
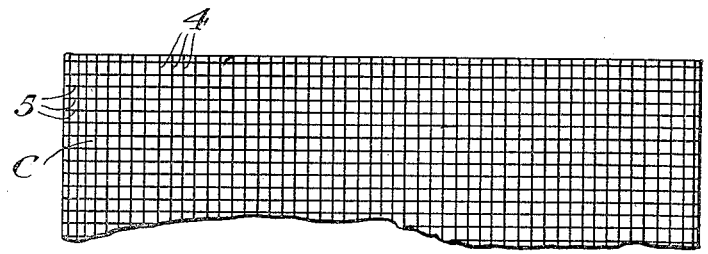
Figure 3:
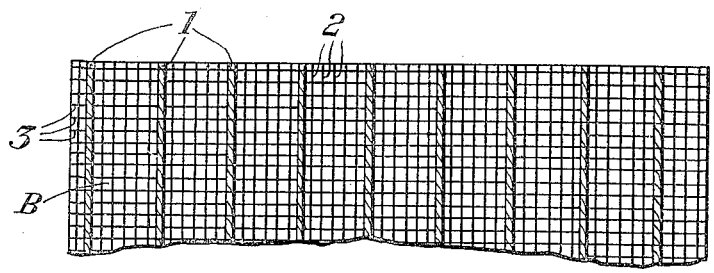
Figure 4:
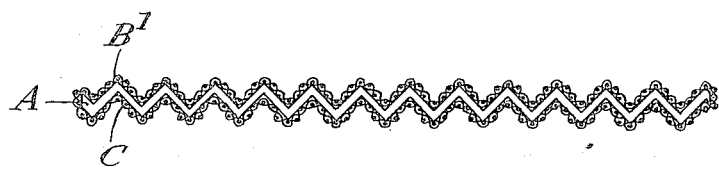

In the accompanying drawing, Fig. 1 is a top view showing one form of storage battery separator embodying my invention. Figs. 2 and 3 are a front view and a rear view, respectively, of the separator illustrated in Fig. 1. Fig. 4 is a top view illustrating a modified form of the separator shown in Fig. 1 and also embodying my invention.

Similar reference characters refer to similar parts in each of the several views.

Referring first to Figs. 1, 2 and 3, the separator comprises a sheet A of porous material such, for example, as felted textile fibres. When such material is immersed in the battery electrolyte the mechanical strength of the sheet is considerably reduced, and to increase the stiffness and strength of the separator I apply at least one re-enforcing sheet to the sheet A. As here shown the separator comprises two re-enforcing sheets C and B applied to the two surfaces respectively of sheet A. One of these re-enforcing sheets C is a coarsely woven fabric having warp strands 4 and woof strands 5 of substantially uniform size. I prefer to treat this fabric with an electrolyte resistant impregnating material, such as bitumen before applying it to the sheet A. After impregnation the fabric is pressed into contact with one face of the sheet A and is secured in that position by adhesion of the impregnating material. The other re-enforcing sheet B is similar to sheet C except that certain of the warp strands 1 are of comparatively greater size and strength than the intervening warp strands 2 or the woof strands 3. The purpose of this construction is to further increase the strength of the separator. The sheet B is attached to the surface of the separator in the same manner as sheet C.

If desired, one of the re-enforcing sheets may be folded over the edges of sheet A, as indicated at 6, thus enclosing the porous material in an envelope of coarsely woven fabric.

In the modified form of separator shown in Fig. 4, the porous sheet A is provided on one face with a sheet C exactly as in Fig. 1. The sheet A is also provided on its rear face with a sheet B' of fabric similar to sheet C, that is, without the large strands 1 of Fig. 1. The two fabric sheets B' and C are attached to the porous sheet A by adhesion of the impregnating material with which the fabric sheets are treated, and the whole separator is then corrugated as shown in the drawing. This form of construction increases the strength of the separator and also provides vertical ducts between the separator and the battery plate in the assembled battery for the free escape of generated gases.

One advantage of separators embodying my invention over the separators hitherto known, is that the sheet A may be made of material which is extremely porous and which if used alone would not have sufficient mechanical strength to be used in a battery. By the addition of the fabric sheets to the faces of the sheet A the porosity of the separator is not appreciably reduced but the mechanical strength of the separator is substantially increased.

Although I have herein shown and described only two forms of storage battery separators embodying my invention, it is understood that various changes and modifications may be made therein within the scope of the appended claims without departing from the spirit and scope of my invention.

Having thus described my invention, what I claim is:

1. A storage battery separator comprising a sheet of porous material, and a re-enforcing sheet of coarsely woven fabric impregnated with electrolyte resistant material.

2. A storage battery separator comprising a sheet of porous material, and a sheet of coarsely woven fabric treated with an electrolyte resistant impregnating material and attached to one face of said porous sheet by the adhesion of such impregnating material.

3. A storage battery separator comprising a sheet of porous material, and a sheet of coarsely woven fabric attached to one face of said porous sheet and having a plurality of warp strands of greater size and strength than the intervening strands of the warp.

4. A storage battery separator comprising a coarsely woven fabric having a plurality of spaced warp strands of comparatively great size and strength, intervening warp strands of comparatively small size and strength, and a woof.

5. A storage battery separator comprising a coarsely woven fabric impregnated with electrolyte resistant material and having a plurality of spaced warp strands of comparatively large size and strength, intervening warp strands of comparatively small size and strength, and a woof.

6. A storage battery separator comprising a sheet of porous material, and a sheet of coarsely woven fabric impregnated with electrolyte resistant material and attached to one face of said porous sheet, said fabric having warp strands of different sizes.

7. A storage battery separator comprising a sheet of porous material, and a sheet of coarsely woven fabric treated with electrolyte resistant impregnating material and having warp strands of different sizes, said fabric being attached to said porous sheet by the adhesion of said impregnating material.

8. A storage battery separator comprising a sheet of porous material, a first sheet of coarsely woven fabric having substantially uniform warp and woof strands; and a second sheet of coarsely woven fabric having comparatively large spaced warp strands, comparatively small intervening warp strands, and woof strands, said two sheets of fabric being treated with electrolyte resistant impregnating material and attached to opposite faces of said porous sheet by adhesion of said impregnating material.

9. A storage battery separator comprising a corrugated sheet of porous material, and a corrugated sheet of coarsely woven fabric impregnated with electrolyte resistant material and attached to one face of said porous sheet.

In testimony whereof I affix my signature.

PAUL E. NORRIS.